(12) United States Patent
van den Berg et al.

(10) Patent No.: US 7,436,643 B2
(45) Date of Patent: Oct. 14, 2008

(54) PROTECTION CIRCUIT

(75) Inventors: Eric Jozef Diane van den Berg, Nijlen (BE); Johan Walter Van Dingenen, Affligem (BE)

(73) Assignee: Alcatel, Paris (FR)

( * ) Notice: Subject to any disclaimer, the term of this patent is extended or adjusted under 35 U.S.C. 154(b) by 239 days.

(21) Appl. No.: 11/312,699

(22) Filed: Dec. 21, 2005

(65) Prior Publication Data
US 2006/0133001 A1    Jun. 22, 2006

(30) Foreign Application Priority Data
Dec. 22, 2004    (EP)    ................... 04293079

(51) Int. Cl.
*H02H 5/04*    (2006.01)
(52) U.S. Cl. ..................... 361/93.9; 361/104
(58) Field of Classification Search ............... 361/18, 361/86, 103, 104, 93.7–93.9, 58, 88; 327/322; 323/222
See application file for complete search history.

(56) References Cited

U.S. PATENT DOCUMENTS

| 2,973,439 | A | 2/1961 | Wright |
| 5,010,293 | A | 4/1991 | Ellersick |
| 5,991,175 | A | 11/1999 | Liu |
| 6,735,064 | B2 * | 5/2004 | Miyazaki ............... 361/58 |
| 6,781,502 | B1 | 8/2004 | Robb |

FOREIGN PATENT DOCUMENTS

EP    0 848 472 A1    6/1998

\* cited by examiner

*Primary Examiner*—Michael J Sherry
*Assistant Examiner*—Danny Nguyen
(74) *Attorney, Agent, or Firm*—Sughrue Mion, PLLC

(57) ABSTRACT

A protection circuit (P) for protecting a load (L) against overcurrents, and including input terminals (IN1,IN2) coupled to first and second power supply terminals of a power supply, output terminals (OUT1, OUT2) coupled to respective terminals of said load (L), a first active device (T2) having a control electrode and a conductive controlled path coupled between the first input terminal (IN1) and the first output terminal (OUT1), a charging circuit (I,C1,R4) for turning on the active device upon coupling the power supply to the input terminals (IN1,IN2), a current limiting circuit (R2,T1) for limiting the current through the conductive path of said active device (T2) at a current limit value ($I_{limit}$), and a fuse (F1) coupled in series via the first input terminal with the conductive controlled path of the active device (T2). The current limiting circuit (R2,T1) includes regulating means (R1,C3,R3) for dynamically regulating said the current limit ($I_{limit}$) value through the active device (T2) thereby further regulating the time to the blowing of said fuse (F1).

14 Claims, 2 Drawing Sheets

Classic solution (prior art)

PROTECTION CIRCUIT

BACKGROUND OF THE INVENTION

The present invention relates to a protection circuit to be used for protecting a load. Such a load may consist of an electronic circuit such as circuitry placed on a printed circuit board, hereafter abbreviated with PCB, or of a DC/DC converter, or more generally DC powered devices.

Protection circuits are used throughout the electronics industry and are for instance described in European patent EP 0 848 472. Basically such protection circuits are intended to protect the circuitry of the load against inrush currents during hot insertion. Similarly, when detaching the supply terminals from the load, for instance during extraction of the board from the power feeding connector, the protection circuit has to protect the load against possible damage.

In general also a fuse is coupled in series with one of the input supply terminals of the protection circuit. The function of such a fuse is to additionally protect the protection circuit as well as the supplies against overcurrents, due to for instance a possible short circuit of the load itself. Furthermore the protection circuit itself often includes a current limitation circuit for limiting the current through this protection circuit, in case of overcurrents drawn by the load or even due to a short caused by the load. This provides yet an additional degree of protection. Such a current limitation circuit may sense the current flowing through the protection circuit and provide for a limitation when this current exceeds a predetermined threshold value.

However in practice it has turned out to be very difficult for finding a good balance between this predetermined threshold value, upon which detection the current limitation circuit becomes active and starts to effectively limit the current through the protection circuit, and the selection of the fuse by selecting its nominal value in function of the nominal current consumed by the load. Different considerations are to be taken into account for this selection:

1. The fuse rating should be above the maximum current consumed by the board during normal operation.

2. The threshold value of the in rush current limitation should be as low as possible during insertion of the board.

3. The threshold value of the current limiting circuit should be above the fuse rating, to make sure that the fuse blows in case of a short at the input side of the load, but the "I-t"-curve of the fuse should not be crossed while the tank capacitors at the input of the load such as a DC/DC converter are charged during hot insertion. If-the set value of the current limitation circuit is not 3 to 4 times above the fuse rating, it will take too long for the fuse to blow in case of a converter short or other excessively low impedance path, resulting in thermal overload of the current regulation component. The typical failure mode for the current regulation component is a short, resulting in a temporary short (until the fuse blows) of the battery, which may affect system operation in case of a single fault.

4. The large spread in battery voltages (38 . . . 72 V when compatible with the ETSI & ANSI markets), results in a large spread of charges to be handled during hot insertion.

Due to the combination of these problems, an overload condition at the load that results in the current through the protection circuit to exceed the threshold current by a relatively small amount will not cause the fuse to blow, in a safe time frame, which nevertheless creates a possible safety hazard.

SUMMARY OF THE INVENTION

An object of the present invention is therefore to provide a protection circuit of the above known kind, but which can solve the above mentioned issues of safety and consequently ensures proper operation of the other loads using the same supply rail.

According to the invention, this object is achieved due to the fact that the protection circuit includes the features as set out in claim 1.

In this way, the current limitation circuit includes means for dynamically regulating the current limit value through the first active device, which presents the current limit value through the protection circuit. By dynamically acting upon this current limit value, i.e. by gradually changing this value as is set out in claim 2, the time to reach a critical value at the I-t characteristic of the fuse will decrease, resulting in a faster blowing of the fuse.

More in particular, the initial value of the current limit is set at a predetermined level, generally corresponding to the worst case maximum current drawn during normal operation. This allows to handle current spikes caused by transients in the supply voltage. The current limit is then gradually increased from that point on. This allows to tackle more persistent overcurrent situations, due to malfunctions caused by the load. By gradually increasing this current limit, temporarily more current will flow through the protection circuit and thus also through the fuse, such that another point at the I-t characteristic of the fuse will be selected, which occurs at a higher current. Since yet this current is located at a point in the I-t characteristic which requires less time for blowing, the fuse will yet blow up in a shorter time. The peak power dissipated is not lower than in the case that this regulating means was not present, but the total power dissipated in the protection circuit is significantly less. Thus an extra degree of safety is built in.

Other characteristics of the present invention are set out in the appended claims.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

BRIEF DESCRIPTION OF THE DRAWINGS

The above and other objects and features of the invention will become more apparent and the invention itself will be best understood by referring to the following description of an embodiment taken in conjunction with the accompanying drawings wherein FIG. 1 shows a schematic of a prior art protection circuit together with the I-t characteristic of the fuse and the points reached during overcurrent operating conditions, and.

DETAILED DESCRIPTION OF THE INVENTION

Figure 1:
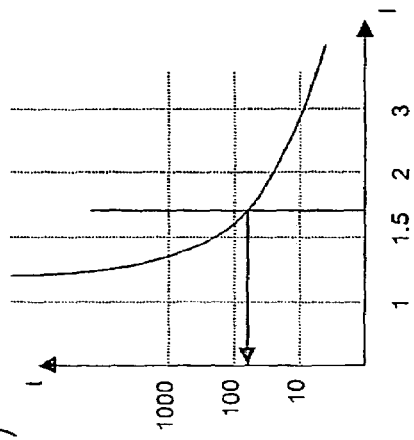
Figure 1:
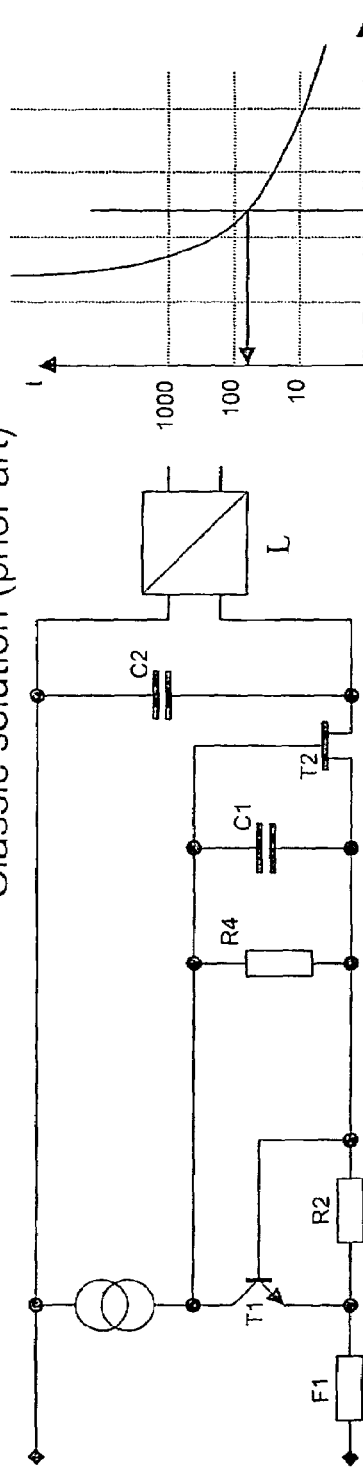
Figure 2:
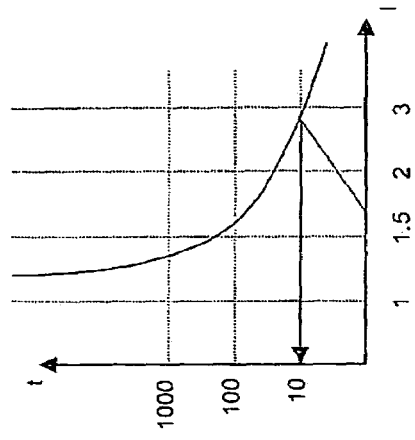
FIG. 2 shows a schematic of protection circuit according to the invention, together with the I-t characteristic of the fuse and the points reached during overcurrent operating conditions.
Figure 2:
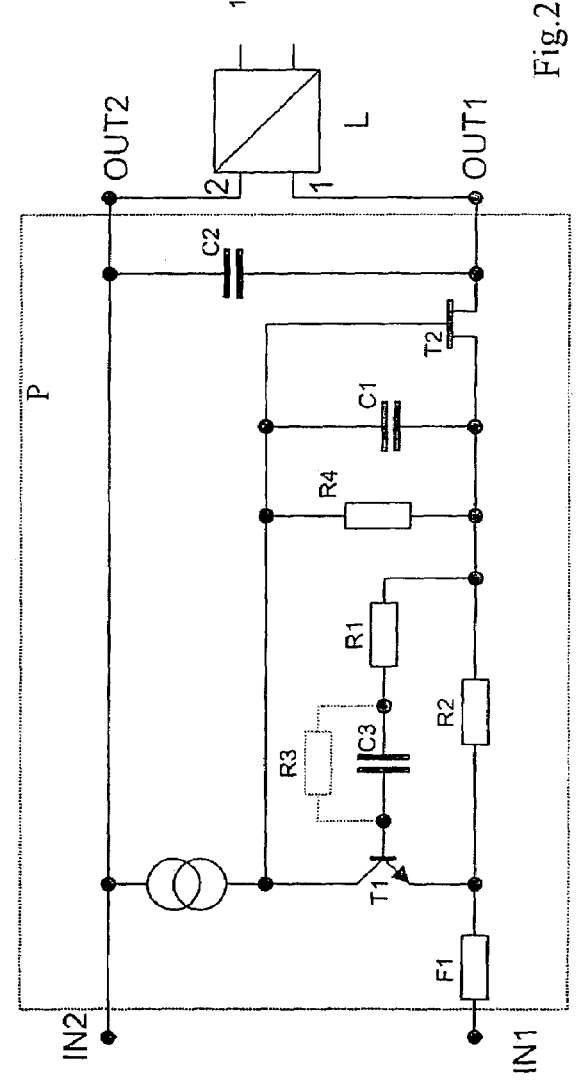

The present invention is of interest in electronics systems, for instance telecommunications systems, where it is often necessary to exchange cards or printed circuit boards, hereafter abbreviated with PCB, while the remaining circuit cards are in an operating state. When inserting or extracting a card to or from a backplane or board, several amperes can flow in the supply lines of the card, as well as in the board power supply of the backplane. If no precautions are taken, this board power supply, as well as the electronic circuitry on the card, can be damaged. Referring to FIGS. 1 and 2, the electronic circuitry on the card is denoted by L and the main supply lines to this load are denoted 1 and 2. To protect the load from overcurrents during hot insertion conditions, protection circuits are provided, their main functional blocks comprising a first active device T2, having a control electrode and a conductive controlled path which is coupled between a first input terminal IN1 and a first output terminal OUT1 of the protection circuit. T2 may consist of a power MOSFET or of a bipolar transistor, but other embodiments in other technologies may also be envisaged.

The load is to be coupled between the two output terminals OUT1 and OUT2 of the protection circuit P. The other input terminal IN2 of the protection circuit is coupled to the second output terminal OUT2.

The control electrode of this first active device T2 is controlled by a charging circuit, which, in the embodiment depicted on FIGS. 1 and 2 comprises a current source I, a capacitor C1 and a resistor R4 in parallel with this capacitor. The function of this charging circuit is to activate T2, by providing a voltage across its gate-source terminal in case of a MOS transistor constituting T2, such that this active device T2 will turn on and accordingly conduct, thereby gradually passing current from the supply to be coupled to the input terminals IN1 and IN2, to the load L. During extraction of the protection circuit from the supply, the resistor R4 serves to decharge the capacitor C1 and thus also the gate-source capacitance of T2, such as to turn T2 off.

The protection circuit further includes a fuse F1 which main function is to protect the circuit, more in particular the active device T2 thereof, as well as to protect the power supply itself against short circuits in the load. This fuse can be a standard thermal melt down fuse, a magnetic fuse a self healing fuse such as a PTC resistor etc.

Each fuse is characterised by its I-t characteristic, such as shown in FIGS. 1 and 2. This I-t characteristic depicts the time needed for blowing up of the fuse, when a particular current is flowing through this fuse. This time is relatively high for low currents, and low for higher currents. The current for blowing up the fuse is also denoted the critical current $I_{crit}$.

In addition to this fuse the protection circuit P includes a current limiting circuit which main function consists in limiting the current through the conductive path of the active device T2. This current limiting circuit guarantees to surge current requirements similar to the one described in the previously mentioned ETSI standard.

This current limiting circuit includes a sensing resistor R2 for continuously sensing the current through this active device, and it is thus placed in series with the conductive path of this active device. When this current exceeds a critical level, the current limiting circuit starts to decrease this current by setting on a second active device T1, which will now conduct the current from the current source I. This results in prohibiting of further charging of the capacitor C1, and accordingly the gate-source of T2, thereby limiting the current through T2. The critical threshold current for conduction of T1 is determined by its own threshold for conduction. In case T1 consists of a bipolar transistor this threshold is determined by a base-emitter voltage of 0.7 V. This means that the product of the current through R2, multiplied by R2 has to exceed 0.7 V before T1 is turned on.

In most embodiments, such as the one depicted in FIG. 1, an additional base protection resistor R1 is placed in series to the control terminal of T1. However this resistor R1 is optional.

The current limiting circuit according to the invention further includes regulating means for regulating the current limit of the current limitation circuit and thus the current limit through the active device T2. As can be seen on FIG. 3b, the current limit value is initially set at a predetermined threshold value $I_t$ and is then gradually increased over time, in contrast to the classical situation depicted in FIG. 3a where this limit current is kept at its constant predetermined initial limit value. By gradually increasing $I_{limit}$ this regulating means also further regulates the time for the blowing of the fuse. In the embodiment depicted in FIG. 2 this regulating means consists of an R-C circuit, consisting of capacitor C3 in series with resistor R1. In addition an extra resistor R3 can be placed in parallel with C3 to make sure that C3 is discharged faster after partially being loaded by a current surge condition. However in its most simple form, the regulating means may merely include the capacitor C3 alone in the base path of T1, thus without R1 nor R3.

Figure 3B:
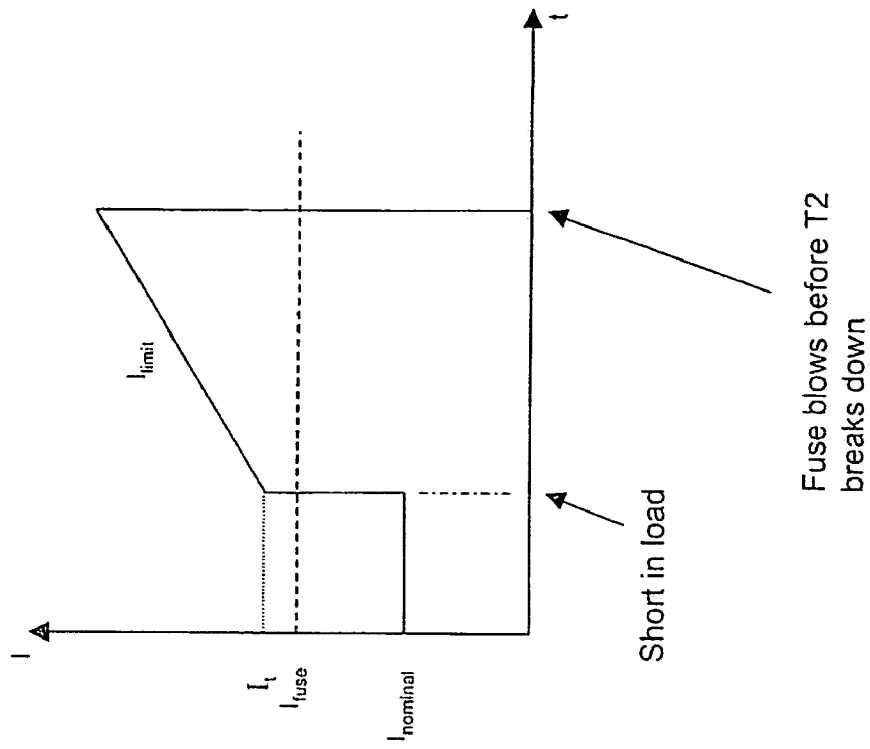
FIGS. 3a and 3b show the value of the current through T2 as a function of time, both for the prior art and for the present protection circuit, in case of a short circuit occurring at the load.
Figure 3A:
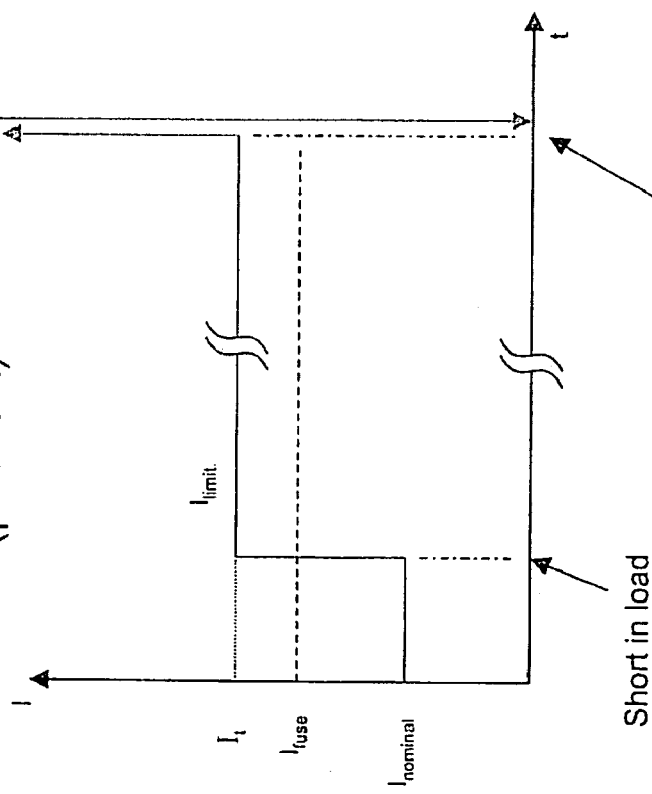

Its function can be understood from comparing the I-t characteristics of the fuse depicted in FIGS. 1 and 2 ,in conjunction with the I-t characteristic of current through T2 itself depicted in FIGS. 3a and b. FIG. 1 shows the operation of the fuse in case of a current limiting circuit without regulating means and FIG. 2 shows this operation in case a regulating means is present. In FIG. 1 the current limit is a fixed value corresponding to the predetermined current threshold value $I_t$ also depicted in FIGS. 3a. The prior art current limiting circuit immediately reacts upon reaching this fixed threshold such that the current through T2, and accordingly through F1, will be limited at this particular threshold value, being 1.7 A in the example depicted in FIG. 1. At this current it takes about 90 seconds before the fuse starts blowing. However during these 90 seconds, damage can already have occurred to T2 due to thermal overload, as can be observed from FIG. 3a.

To prevent this damage, the presence of the regulating circuit in the current limiting circuit of FIG. 2 regulates the current limit value dynamically, as can also be observed from FIG. 3b. FIG. 3b shows that the current through T2 is initially limited at a threshold value $I_t$, but from that point in time on, this limit current $I_{limit}$ itself starts to increase. On FIGS. 2 and 3b this increase is depicted as the linear increase of $I_{limit}$ in time, indicating the current increase through T2. By temporarily allowing more current to flow through T2, a point at the I-t characteristic of the fuse F1 is reached, situated at higher currents, but at a much lower time. This means that F1 will blow up in a shorter time, while the total average power is less than in the prior art circuit, allowing T2 to survive the temporary current increase.

Of course other implementations than these that are depicted in FIG. 2 are possible.

While the principles of the invention have been described above in connection with specific apparatus, it is to be clearly understood that this description is made only by way of example and not as a limitation on the scope of the invention, as defined in the appended claims.

The invention claimed is:

1. A protection circuit for protecting a load against overcurrents, said protection circuit including:
   first and second input terminals to be coupled to first and second power supply terminals of a power supply,
   first and second output terminals to be coupled to respective terminals of said load,
   a first active device having a control electrode and a conductive controlled path coupled between said first input terminal and said first output terminal,
   a charging circuit for turning on said active device upon coupling said power supply to said input terminals,
   a current limiting circuit for limiting the current through said conductive path of said first active device at a current limit value,
   a fuse coupled in series via said first input terminal with said conductive controlled path of said first active device,
   wherein said current limiting circuit further includes regulating means for dynamically regulating said current limit value through said first active device thereby further regulating a time to blowing of said fuse.

2. The protection circuit according to claim 1, wherein said regulating means is further adapted to gradually change the current limit value through said first active device, thereby decreasing a time to reach a critical current at the I-t characteristic of the fuse, for blowing of the fuse.

3. The protection circuit according to claim 2 wherein said current limit is gradually increased starting from a predetermined threshold current limit value.

4. The protection circuit according to claim 1, wherein said charging circuit comprises a current source in series with a capacitor, said capacitor coupled between a control terminal of said first active device and one conductive path terminal of said first active device.

5. The protection circuit according to claim 4 wherein said charging circuit further includes a resistor coupled in parallel to said capacitor.

6. The protection circuit according to claim 1 wherein said current limiting circuit includes a sensing device coupled in series between said fuse and said conductive path of said first active device, and a second active device for controlling the current through said first active device upon sensing that said current through said first active device exceeds said current limit value.

7. The protection circuit according to claim 6, wherein said regulating means in said current limiting circuit includes a capacitor in the control path of said second active device.

8. The protection circuit according to claim 7, wherein said regulating means in said current limiting circuit further includes a resistor in series with said capacitor in the control path of said active device.

9. The protection circuit according to claim 8, wherein said regulating means further includes a current limitation resistor coupled in parallel across said capacitor in the control path of said second active device.

10. The protection circuit according to claim 1 further including a coupling capacitor between said output terminals.

11. The protection circuit according to claim 6, wherein said sensing device is a resistor.

12. The protection circuit according to claim 1, wherein said first active device is a power MOSFET.

13. The protection circuit according to claim 1, wherein said first active device is a bipolar transistor.

14. The protection circuit according to claim 6, wherein said second active device is a bipolar transistor.

* * * * *